United States Patent
Taya

(10) Patent No.: US 10,708,505 B2
(45) Date of Patent: Jul. 7, 2020

(54) IMAGE PROCESSING APPARATUS, METHOD, AND STORAGE MEDIUM

(71) Applicant: CANON KABUSHIKI KAISHA, Tokyo (JP)

(72) Inventor: Kaori Taya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 15/934,131

(22) Filed: Mar. 23, 2018

(65) Prior Publication Data

US 2018/0295289 A1 Oct. 11, 2018

(30) Foreign Application Priority Data

Apr. 5, 2017 (JP) .................. 2017-075389

(51) Int. Cl.
| | |
|---|---|
| *H04N 5/232* | (2006.01) |
| *G06T 15/20* | (2011.01) |
| *G06T 17/00* | (2006.01) |
| *H04N 5/222* | (2006.01) |
| *H04N 13/117* | (2018.01) |
| *H04N 13/243* | (2018.01) |
| *H04N 5/247* | (2006.01) |

(52) U.S. Cl.
CPC ....... *H04N 5/23293* (2013.01); *G06T 15/205* (2013.01); *G06T 17/00* (2013.01); *H04N 5/2226* (2013.01); *H04N 5/23222* (2013.01); *H04N 5/23229* (2013.01); *H04N 5/232939* (2018.08); *H04N 13/117* (2018.05); *H04N 13/243* (2018.05); *H04N 5/247* (2013.01)

(58) Field of Classification Search
CPC ............ H04N 5/2226; H04N 5/23222; H04N 5/23229; H04N 5/23293; H04N 5/232939; H04N 13/111; H04N 13/117; H04N 13/243; G06T 15/205; G06T 17/00
See application file for complete search history.

(56) References Cited

U.S. PATENT DOCUMENTS

| | | | |
|---|---|---|---|
| 8,817,067 B1 * | 8/2014 | Fan ..................... | H04N 5/23238 348/36 |
| 2009/0315978 A1 * | 12/2009 | Wurmlin ................. | G06T 5/005 348/43 |

(Continued)

FOREIGN PATENT DOCUMENTS

JP 2003067778 A 3/2003

*Primary Examiner* — Daniel M Pasiewicz
(74) *Attorney, Agent, or Firm* — Rossi, Kimms & McDowell LLP

(57) ABSTRACT

An image processing apparatus according to an embodiment of the present invention specifies a partial area of a three-dimensional shape model that is generated based on a plurality of captured images obtained by a plurality of cameras. The image processing apparatus includes: a display control unit configured to display a display image based on a captured image of at least one camera of the plurality of cameras on a display unit; a designation unit configured to designate an area on the display image displayed by the display control unit; and a specification unit configured to specify an area on a three-dimensional shape model, which corresponds to an area designated by the designation unit on the display image, based on captured images of two or more cameras of the plurality of cameras.

14 Claims, 15 Drawing Sheets

(56) References Cited

U.S. PATENT DOCUMENTS

2014/0139734 A1* 5/2014 Chui .................... H04N 7/0125
348/441
2014/0300566 A1* 10/2014 Lee ........................ G06T 15/00
345/173
2017/0148223 A1* 5/2017 Holzer ................... H04N 5/265

* cited by examiner

IMAGE PROCESSING APPARATUS, METHOD, AND STORAGE MEDIUM

BACKGROUND OF THE INVENTION

Field of the Invention

The present invention relates to an image processing apparatus, a method, and a storage medium.

Description of the Related Art

In recent years, a technique to acquire three-dimensional shape data of an object has been developing. It is possible to acquire three-dimensional shape data of an object by, for example, a method using a three-dimensional scanner with a laser or a method of estimating three-dimensional shape data from a plurality of images obtained by capturing the same object from different viewpoints. In the case where acquired three-dimensional shape data is edited, it is necessary for a user to designate an editing range.

Japanese Patent Laid-Open No. 2003-067778 has disclosed a technique to specify a polygon (mesh) of a three-dimensional shape of a target by finding a corresponding point of a point designated by a user on a two-dimensional texture within a three-dimensional space.

However, with the conventional technique, it is not possible for a user to designate a range of a three-dimensional point group with accuracy. With the technique described in Japanese Patent Laid-Open No. 2003-067778, the accuracy of a specified three-dimensional shape is reduced because a polygon (mesh) is used. Further, in the case where a two-dimensional texture is generated from a plurality of images, inconsistency occurs at a seam, and in the case where a two-dimensional texture is generated from one image, it is not possible to specify a portion that cannot be recognized on the two-dimensional texture (so-called occlusion portion).

SUMMARY OF THE INVENTION

An image processing apparatus according to an embodiment of the present invention specifies a partial area of a three-dimensional shape model that is generated based on a plurality of captured images obtained by a plurality of cameras. The image processing apparatus comprises: a display control unit configured to display a display image based on a captured image of at least one camera of the plurality of cameras on a display unit; a designation unit configured to designate an area on the display image displayed by the display control unit; and a specification unit configured to specify an area on a three-dimensional shape model, which corresponds to an area designated by the designation unit on the display image, based on captured images of two or more cameras of the plurality of cameras.

Further features of the present invention will become apparent from the following description of exemplary embodiments with reference to the attached drawings.

DESCRIPTION OF THE EMBODIMENTS

In the following, embodiments of the present invention are explained in detail with reference to the attached drawings.

First Embodiment

In the present embodiment, by using a plurality of pieces of image data corresponding to a three-dimensional point group of an object and image feature points thereof (hereinafter, referred to as a two-dimensional point group), range selection of a three-dimensional point group is performed by an intuitive, simple method as in the case of range selection in a two-dimensional image. The three-dimensional point group in the present embodiment is one estimated by a method, such as SfM (Structure from Motion), from a two-dimensional point group of a plurality of images. The three-dimensional point group is not limited to this and may also be one in which the value of a depth sensor and an image are caused to correspond to each other as long as there is a correspondence between an image and a three-dimensional point group.

In the following, a case is explained where four pieces of image data obtained by capturing an object from viewpoints different from one another, but the present embodiment is not limited to four pieces of image data and can be applied to two or more pieces of image data. Further, the image data of the present embodiment is not limited to that obtained by capturing an object. That is, it is possible to apply the present embodiment to a plurality of pieces of image data representing the same object from different viewpoints.

Figure 1:
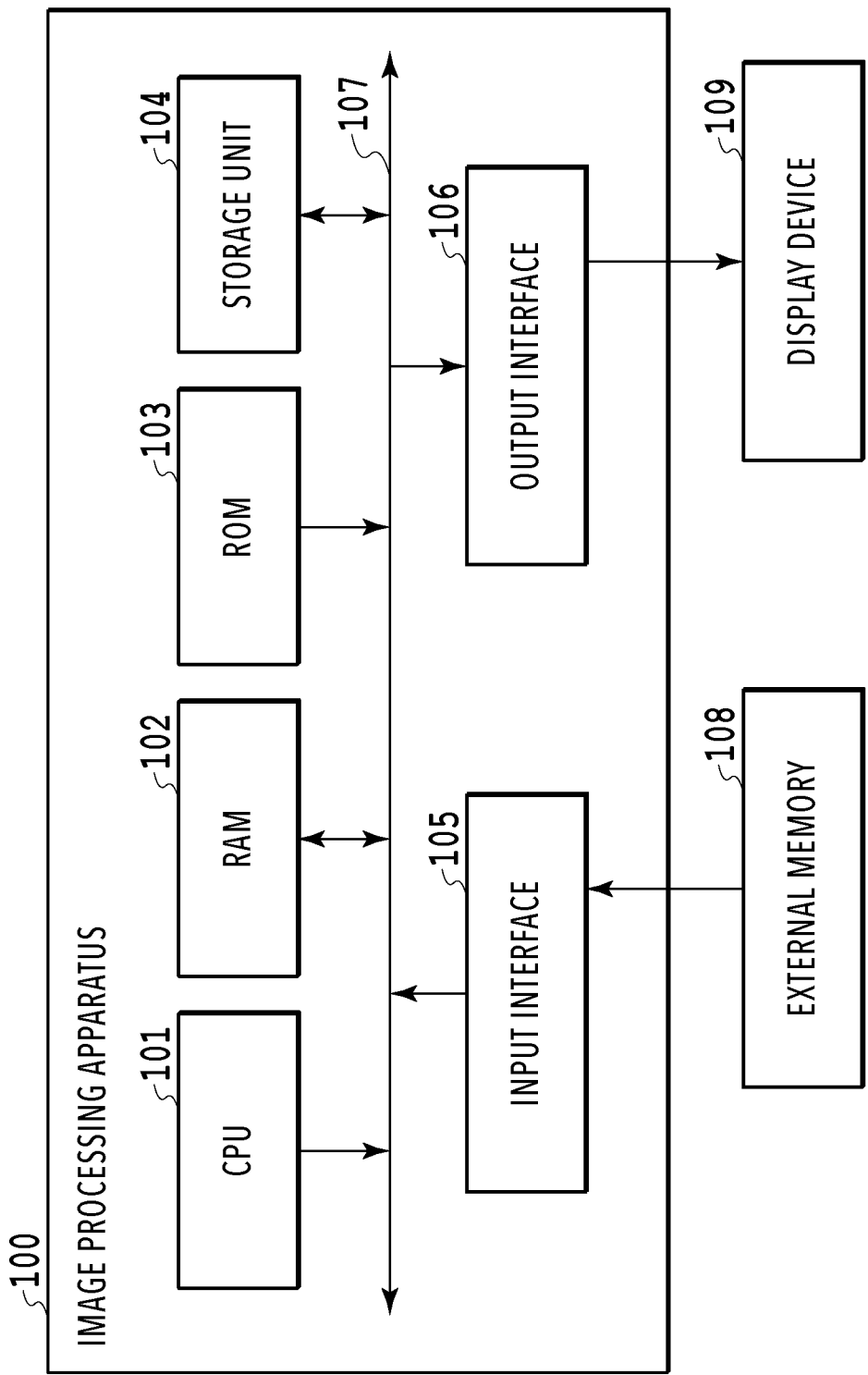
FIG. 1 is a block diagram showing a configuration of an image processing apparatus according to an embodiment.

FIG. 1 shows a configuration of an image processing apparatus 100 according to the present embodiment. The image processing apparatus 100 is made up by including a CPU 101, a RAM 102, a ROM 103, a storage unit 104, an input interface 105, an output interface 106, and a system bus 107. To the input interface 105, an external memory 108 is connected and to the output interface 106, a display device 109 is connected.

The CPU 101 is a processor that centralizedly controls each component of the image processing apparatus 100. The RAM 102 is a memory that functions as a main memory and a work area of the CPU 101. The ROM 103 is a memory that stores programs and the like used for processing within the image processing apparatus 100. The CPU 101 performs various kinds of processing, to be described later, by using the RAM 102 as a work area and executing programs stored in the ROM 103.

The storage unit 104 is a storage device that stores image data used for processing in the image processing apparatus 100, parameters (that is, setting values) for processing, and so on. As the storage unit 104, it is possible to use an HDD, an optical disk drive, a flash memory, and so on.

The input interface 105 is, for example, a serial bus interface, such as USB and IEEE 1394. It is possible for the image processing apparatus 100 to acquire processing-target image data and the like from the external memory 108 (for example, hard disk, memory card, CF card, SD card, USB memory) via the input interface 105. The output interface 106 is, for example, a video output terminal, such as DVI and HDMI (registered trademark). It is possible for the image processing apparatus 100 to output image data processed by the image processing apparatus 100 to the display device 109 (image display device, such as a liquid crystal display) via the output interface 106. The image processing apparatus 100 may include components other than those described above, but explanation is omitted here.

Figure 2:
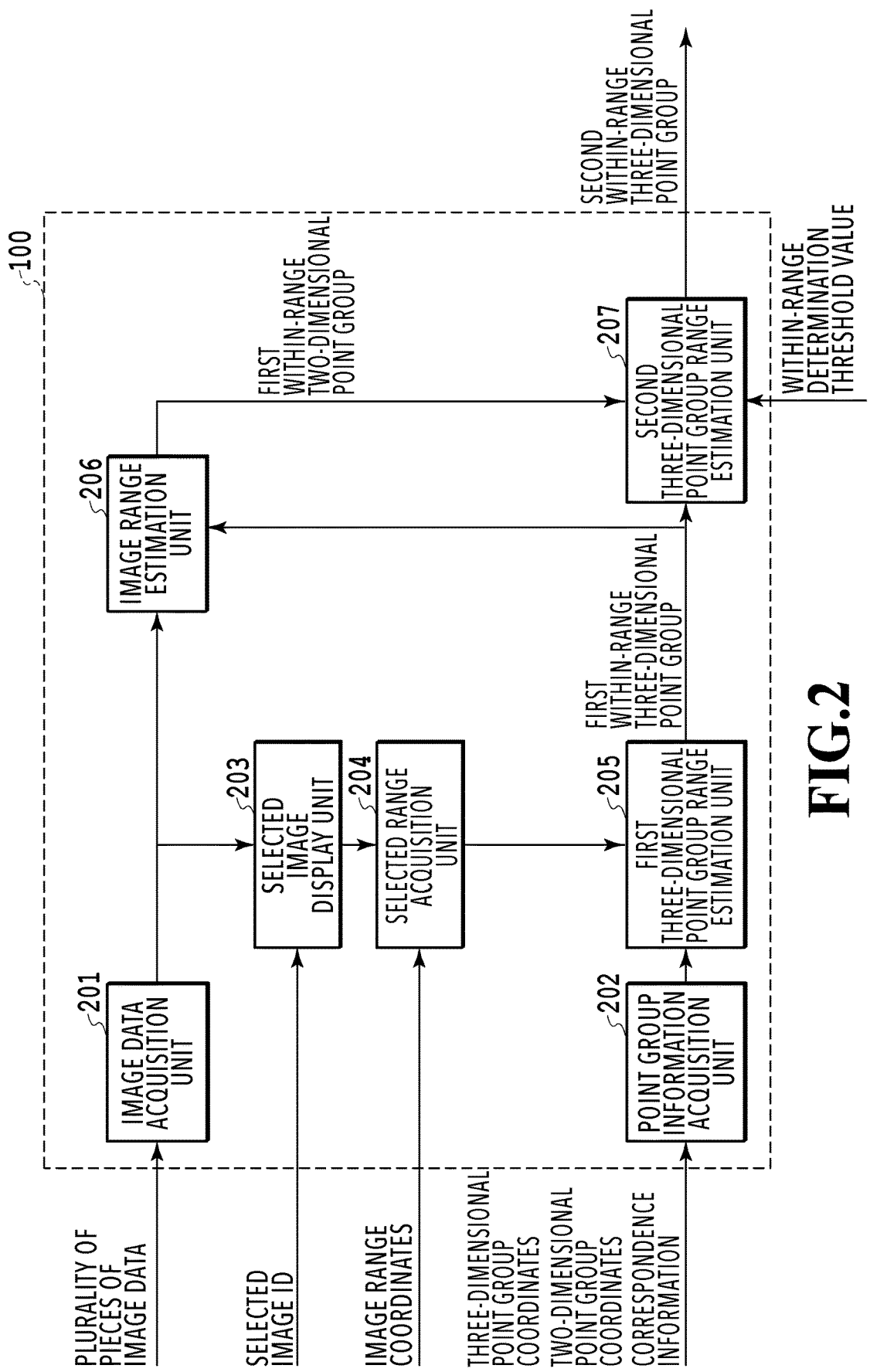
FIG. 2 is a function block diagram of an image processing apparatus according to an embodiment.
Figure 3:
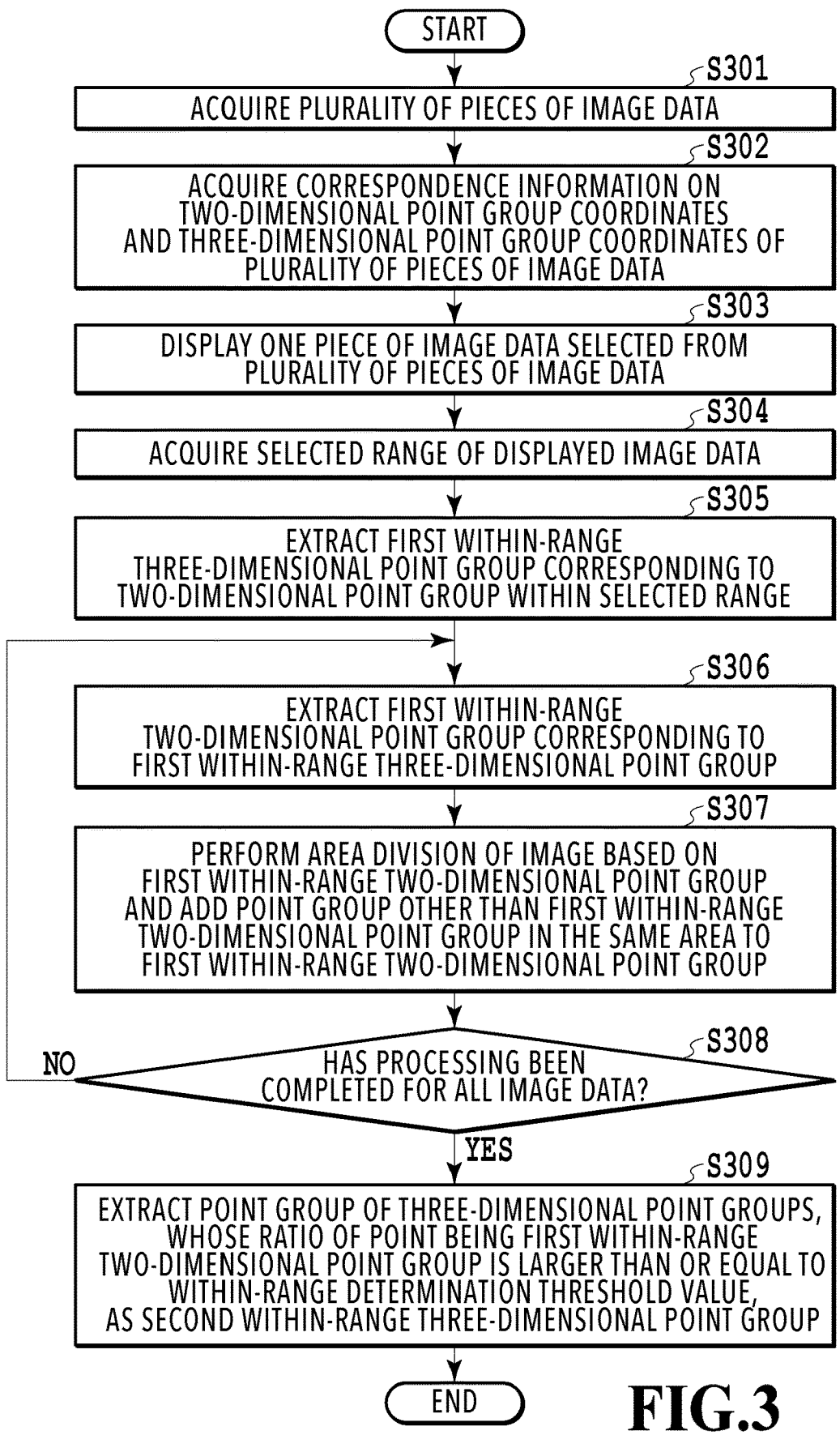
FIG. 3 is a processing flowchart of an image processing method according to an embodiment.

In the following, image processing in the image processing apparatus 100 is explained with reference to FIG. 2 and FIG. 3. FIG. 2 is a function block diagram of the image processing apparatus 100 according to the present embodiment. FIG. 3 is a processing flowchart of an image processing method according to the present embodiment. In the present embodiment, by executing programs stored in the ROM 103, the CPU 101 functions as each block described in FIG. 2 and performs the processing flow in FIG. 3. The CPU 101 does not necessarily need to perform all the functions and it may also be possible to provide a processing circuit corresponding to each function within the image processing apparatus 100.

At step 301, an image data acquisition unit 201 acquires a plurality of pieces of image data from the external memory 108 via the input interface 105 and stores the image data in the RAM 102 along with an image ID (image identifier) to identify each piece of image data. Each of the plurality of pieces of image data is image data obtained by capturing the same object from viewpoints different from one another, that is, image data representing the same object from different viewpoints.

At step 302, a point group information acquisition unit 202 acquires two-dimensional point group coordinates included in each of the plurality of pieces of image data, three-dimensional point group coordinates of the object, and correspondence information on the two-dimensional point group and the three-dimensional point group from the external memory 108 via the input interface 105. The acquired two-dimensional point group, the three-dimensional point group, and the correspondence information are stored in the RAM 102.

At step 303, a selected image display unit 203 acquires an image ID of one piece of image data selected by a user from the plurality of pieces of image data and acquires image data corresponding to the image ID from the RAM 102. That is, the selected image display unit 203 functions as a determination unit configured to determine image data selected by a user from a plurality of pieces of image data as image data that should be displayed. The selected image display unit 203 displays the acquired image data on the display device 109 via the output interface 106.

At step 304, a selected range acquisition unit 204 acquires a two-dimensional point group in a selected range selected by a user on the image displayed on the display device 109 and stores the two-dimensional point group in the RAM 102. A specific acquisition method of a selected range includes, as a simple method, a method of taking an area as a selected range, in which the difference in the pixel value between a pixel within a designated area and a pixel in the designated area, which is one of neighboring pixels, is smaller than or equal to a threshold value. Further, in recent years, as a method of selecting a range with high accuracy, an area division method, called a graph cut, is proposed.

Figure 4:
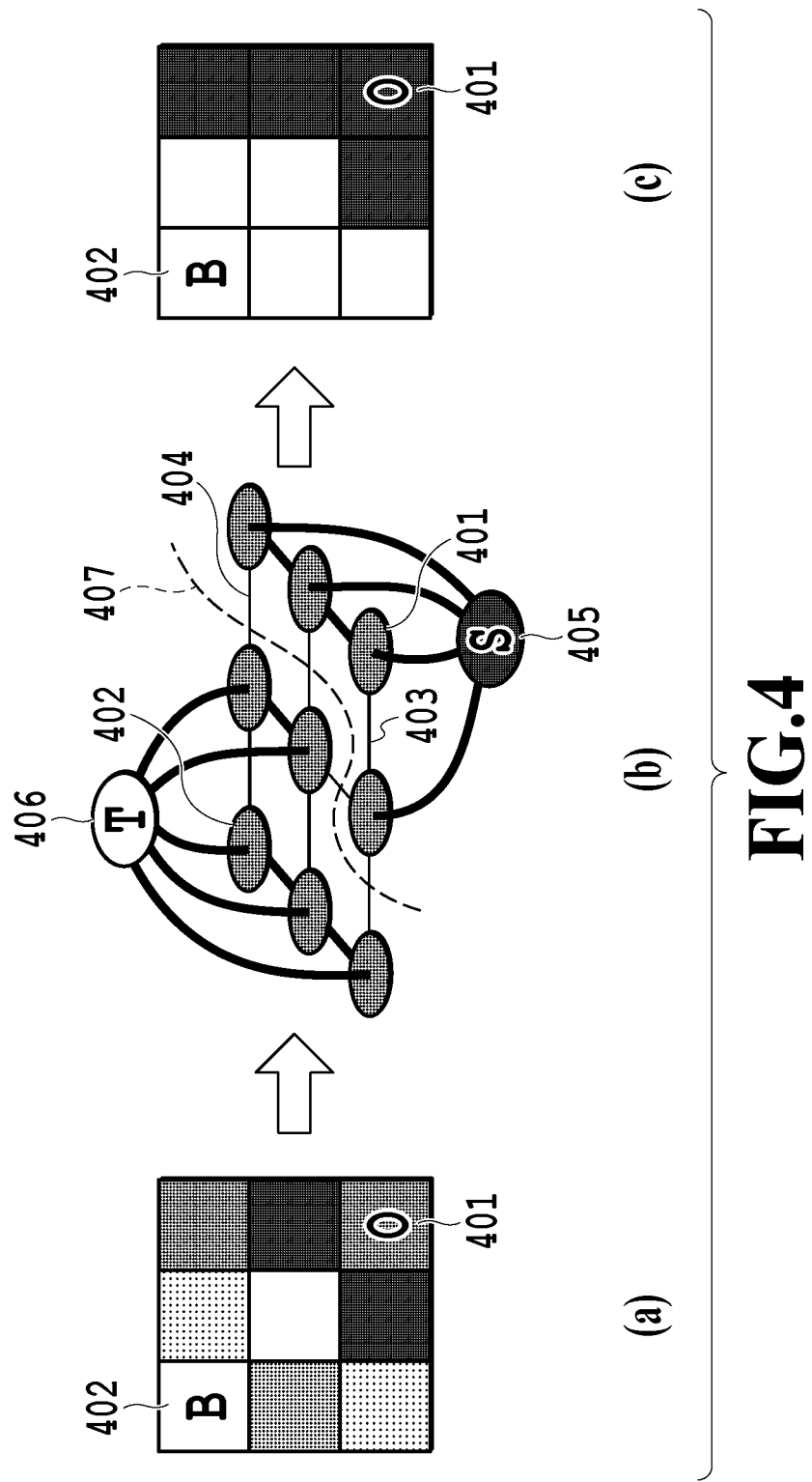
FIG. 4 is a schematic diagram explaining a graph cut method according to an embodiment.

FIG. 4 is a schematic diagram explaining a graph cut method. In the graph cut method, first, as shown in FIG. 4(a), a graph corresponding to an image is generated and a within-range seed pixel 401 and an outside-range seed pixel 402 are given. Next, as shown in FIG. 4(b), similarity between pixels is calculated and pixels between which similarity is high are linked by an edge 403 with a heavy weight and pixels between which similarity is low are linked by an edge 404 with a light weight. Further, a pixel similar to the within-range seed pixel 401 is linked to a within-range node S 405 with a heavy weight and a pixel similar to the outside-range seed pixel 402 is linked to an outside-range node T 406 with a heavy weight. Schematic representation of a link with a weight between pixels not similar to each other is omitted here. Finally, as shown in FIG. 4(c), the graph is cut so that the sum of nodes to be cut becomes a minimum and the side of the within-range node S 405 is taken to be a within-range area and the side of the outside-range node T 406 is taken to be an outside-range area. Specifically, the pixel in the range designated by a user with a mouse and the like is a within-range seed pixel or an outside-range seed pixel. The index of similarity between pixels includes the similarity of color between pixels, the intensity of an edge derived from the magnitude of a difference in the feature amount of an image, the distribution of color in an adjacent area, the distance between pixels, and so on.

At step 305, a first three-dimensional point group range estimation unit 205 extracts a three-dimensional point group corresponding to a two-dimensional point group within the selected range, which is stored in the RAM 102 at step 304, from the three-dimensional point groups acquired at step 302 based on the correspondence information. The first three-dimensional point group range estimation unit 205 stores the extracted three-dimensional point group in the RAM 102 as a first within-range three-dimensional point group. That is, the first three-dimensional point group range estimation unit 205 functions as a first three-dimensional point group extraction unit. Specifically, it may also be possible to add an attribute, such as "within range", to the three-dimensional point group stored in the RAM 102. Further, it may also be possible for the first three-dimensional point group range estimation unit 205 to extract a three-dimensional point group corresponding to the two-dimensional point group determined to be outside the selected range at step 304 based on the correspondence information and to store the three-dimensional point group in the RAM 102 as a first outside-range three-dimensional point group. Furthermore, it may also be possible to extract a three-dimensional point group (not seen in the display image) other than those described above based on the correspondence information and to store the three-dimensional point group in the RAM 102 as an unclassified three-dimensional point group. Specifically, it may also be possible to add an attribute, such as "outside range", to the first outside-range three-dimensional point group and an attribute, such as "unclassified", to the unclassified three-dimensional point group.

Next, at step 306 and step 307, the processing is performed for each of the other pieces of image data other than the image data displayed at step 303 of the plurality of pieces of image data acquired at step 301.

At step 306, an image range estimation unit 206 extracts a two-dimensional point group corresponding to the first within-range three-dimensional point group extracted at step 305 based on the correspondence information for one piece of image data other than the display image data. The image range estimation unit 206 stores the extracted two-dimensional point group in the RAM 102 as a first within-range two-dimensional point group. Specifically, it may also be possible to add an attribute, such as "within range", to the two-dimensional point group stored in the RAM 102. Further, it may also be possible for the image range estimation unit 206 to extract two-dimensional point groups corresponding to the first outside-range three-dimensional point group and the unclassified three-dimensional point group extracted at step 305 based on the correspondence information and to store the two-dimensional point groups in the RAM 102 as a first outside-range two-dimensional point group and a first unknown two-dimensional point group.

At step 307, the image range estimation unit 206 performs area division of an image based on the first within-range two-dimensional point group stored at step 306 and determines whether a point group other than the first within-range two-dimensional point group is included in the same area of the first within-range two-dimensional point group. The image range estimation unit 206 updates the point group other than the first within-range two-dimensional point group, which is included in the same area, and takes the point group as the first within-range two-dimensional point group (that is, the point group is added to the first within-range two-dimensional point group). Further, in the case where the first outside-range two-dimensional point group and the first unknown two-dimensional point group are used, it is sufficient to determine whether the first unknown two-dimensional point group is nearer to the first within-range two-dimensional point group or to the first outside-range two-dimensional point group. In this case, it is sufficient to add the point group of the first unknown two-dimensional point groups, which is determined to be nearer to the first within-range two-dimensional point group, to the first within-range two-dimensional point group. At this time, it may be possible to use the method explained at step 304 as a range estimation method of an image. For example, in the case where the graph cut method is used, it may be possible to use the first within-range two-dimensional point group before updating as the within-range seed 401. Further, in the case where there is an outside-range point group, it may be possible to use the first outside-range two-dimensional point group before updating as the outside-range seed 402. As described above, at steps 306 and 307, the image range estimation unit 206 functions as a first two-dimensional point group acquisition unit configured to acquire the first within-range two-dimensional point group existing in the same area in which the two-dimensional point group corresponding to the first within-range three-dimensional point group is included.

At step 308, the image range estimation unit 206 determines whether the processing has been completed for all the processing-target image data and in the case where there is unprocessed image data, the processing returns to step 306 and the processing is repeated. On the other hand, in the case where the processing of all the image data has been completed, the processing advances to step 309. Here, it may be possible to take all the image data in which the first within-range three-dimensional point group is seen (that is, all the image data in which the two-dimensional point group corresponding to the first within-range three-dimensional point group is displayed) to be the processing-target image data.

At step 309, a second three-dimensional point group range estimation unit 207 extracts a three-dimensional point group of the three-dimensional point groups acquired at step 302, whose ratio of a point being the first within-range two-dimensional point group becomes larger than or equal to a threshold value in each piece of image data. The second three-dimensional point group range estimation unit 207 stores the extracted three-dimensional point group in the RAM 102 as a second within-range three-dimensional point group. Here, a within-range determination threshold value, which is the predetermined threshold value, is acquired from the outside via the input interface 105. As a specific threshold value determination method, for example, it may be possible to perform determination by a ratio of the number of pieces of image data including the point group determined as the first within-range two-dimensional point group to the number of all the pieces of image data in which the first within-range three-dimensional point group is seen. It may also be possible to extract the second within-range three-dimensional point group by linking points in the three-dimensional point group, whose three-dimensional coordinates are near and whose similarity therebetween is high, by an edge and by finding the minimum cut by using the graph cut method explained with reference to FIG. 4. That is, the second three-dimensional point group range estimation unit 207 functions as a second three-dimensional point group estimation unit configured to estimate a second within-range three-dimensional point group corresponding to the selected range selected by a user on the two-dimensional image.

Figure 5:
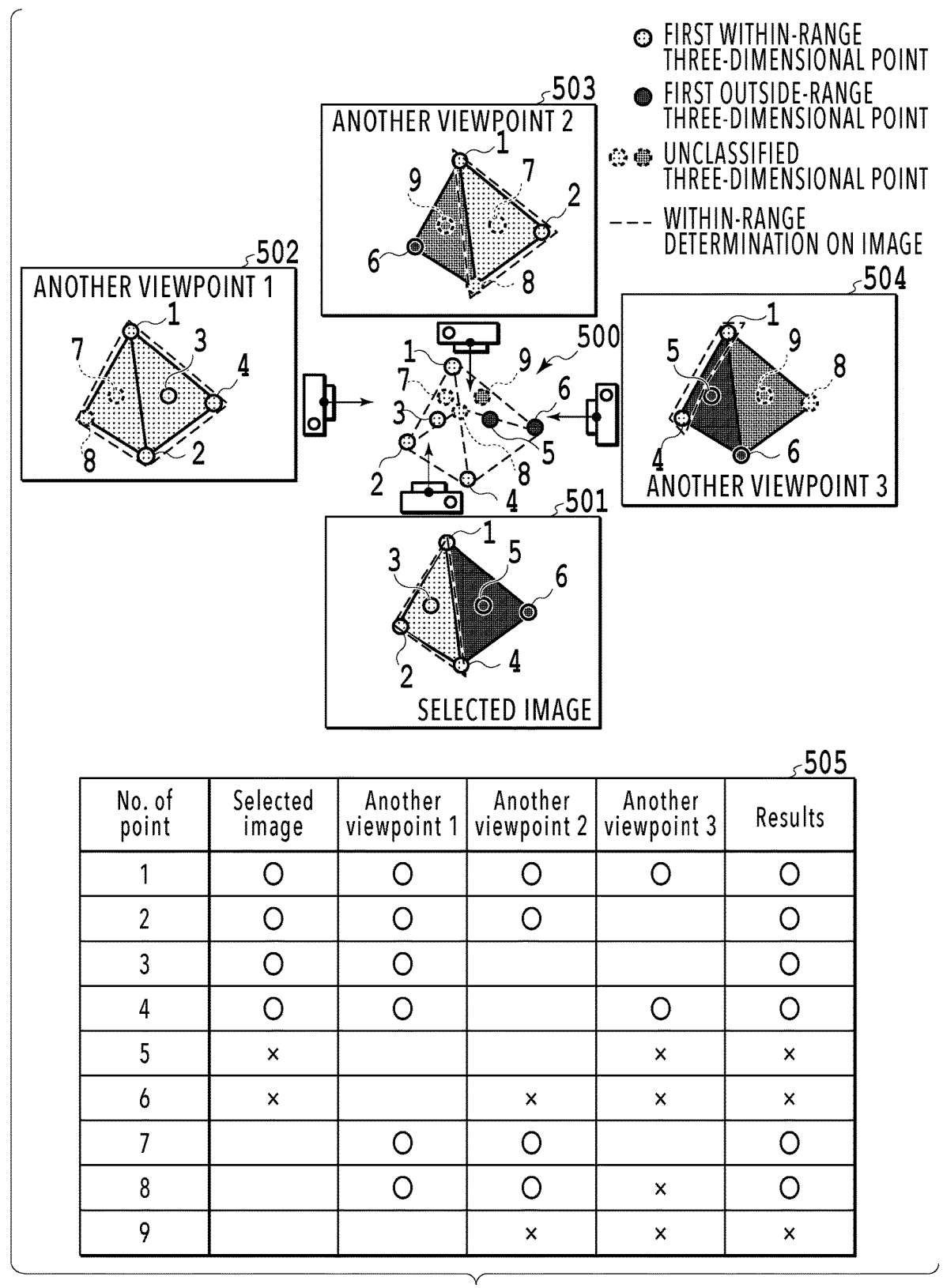
FIG. 5 is a schematic diagram explaining image processing according to an embodiment.

FIG. 5 is a schematic diagram explaining image processing according to the present embodiment. In the following, with reference to the schematic diagram, the image processing according to the present embodiment is explained.

In FIG. 5, a three-dimensional point group 500 representing a three-dimensional shape of an object is a point group including nine points 1 to 9 and four pieces of image data 501, 502, 503, and 504 obtained by capturing the object from different viewpoints are shown. It is assumed that at step 303, the image data 501 is displayed and the range surrounded by a dotted line of the image data 501 (selected image) is taken to be the selected range acquired at step 304. In the selected range, four points 1 to 4 (two-dimensional point group) are included and at step 305, four points 1 to 4 of the three-dimensional point group 500 are extracted as a first within-range three-dimensional point group. In the present embodiment, an example in the case where the selected image shown in FIG. 5 is the captured image itself by the camera selected from the plurality of cameras is explained mainly. However, the example is not limited to this. For example, an image obtained by performing predetermined image processing (for example, pixel thinning processing) for the captured image of the selected camera may be displayed as a selected image or a virtual viewpoint image based on the viewpoint (virtual viewpoint) designated by a user may be displayed as a selected image. Further, in the present embodiment, an example in the case where the number of selected images is one is explained mainly, but the example is not limited to this. For example, captured images (for example, the image data 501 and the image data 503 in FIG. 5) of the two or more cameras of the plurality of cameras may be displayed as selected images.

In the image data 502 of viewpoint 1, in the case where area division is performed according to image similarity, points 1 to 4, 7, and 8 of the two-dimensional point groups are included in one area. Further, points 1 to 4 are the first within-range two-dimensional point group corresponding to the first within-range three-dimensional point group, and therefore, points 7 and 8 included in the same area of points 1 to 4 are also the first within-range two-dimensional point group of the image data 502 (steps 306 and 307).

In the image data 503 of another viewpoint 2, in the case where area division is performed according to image similarity, the area is divided into three areas of the two-dimensional point group: an area of points 1, 2, 7, and 8, an area of point 9, and an area of point 6. Points 1 and 2 are the first within-range two-dimensional point group corresponding to the first within-range three-dimensional point group, and therefore, points 7 and 8 included in the same area of points 1 and 2 are also the first within-range two-dimensional point group of the image data 503 (steps 306 and 307).

In the image data 504 of another viewpoint 3, in the case where area division is performed according to image similarity, the area is divided into four areas of the two-dimensional point group: an area of points 1 and 4, an area of points 5 and 6, an area of point 9, and an area of point 8. Points 1 and 4 are the first within-range two-dimensional point group corresponding to the first within-range three-dimensional point group and another point group is not included in the same area, and therefore, points 1 and 4 are the first within-range two-dimensional point group of the image data 504 (steps 306 and 307).

The above results are put together in a table 505. Of the two-dimensional point groups of each piece of image data, the point that is the first within-range two-dimensional point group is indicated by ○ and the point that is not the first within-range two-dimensional point group is indicated by x. The empty cell in the table 505 indicates a point group (occlusion) of the three-dimensional point group of the object, in which the two-dimensional point group corresponding to each piece of image data is not included.

From the table 505, the ratio of the point being the first within-range two-dimensional point group is 100% for points 1 to 4 and 7, 66.7% for point 8, and 0% for points 5, 6, and 9. In the case where the threshold value (within-range determination threshold value) to determine as the second within-range three-dimensional point group is taken to be 50%, points 1 to 4, 7, and 8 are extracted as the second within-range three-dimensional point group (step 309).

In the present embodiment, the ratio of the point group being the first within-range two-dimensional point group is determined, but it may also be possible to calculate an evaluation value by weighting the image similarity and the distance between a pixel in the first within-range two-dimensional point group and a pixel in the first outside-range two-dimensional point group to find an average value and to perform threshold value processing. Further, it may also be possible to perform setting so as to reduce the weight (degree of reliability) at the time of area division of a plurality of images by taking a point of the first within-range three-dimensional point group, which is located near the boundary between the inside of the selected range and the outside of the selected range in the selected image to be a boundary point.

In the present embodiment, it is possible to automatically perform range selection of a three-dimensional point group within a range neighboring and similar to the selected range based on the selected range on one selected image in this manner.

As explained above, according to the present embodiment, it is possible to estimate the range of a three-dimensional point group with high accuracy, which corresponds to the range selected by a user on the two-dimensional image. In the above-described embodiment, the four cameras are used, but the number of cameras is not limited to four. Further, in the present embodiment, the example is explained in which range selection of a three-dimensional point group is performed by using all the captured images of the plurality of cameras, but the example is not limited to this. For example, in the case where the range of points 1 to 4 of the image data 501 in FIG. 5 is designated, it may also be possible to perform range selection of a three-dimensional point group by using the image data 502 and 503 without using the image data 504. The larger the number of pieces of image data to be used for range selection of a three-dimensional point group, the heavier the processing load becomes, but the higher the accuracy of range selection becomes. Consequently, it may also be possible to determine the number of images to be used for range selection in accordance with the required accuracy.

Second Embodiment

In a second embodiment, by using the second within-range three-dimensional point group that is output in the above-described first embodiment, range selection is performed in a plurality of pieces of image data representing the same object from different viewpoints.

In the above-described first embodiment, it is premised that the two-dimensional point group corresponding to the three-dimensional point group is set correctly in each piece of image data, but there is a case where the two-dimensional point group corresponding to the three-dimensional point group is not set correctly. For example, there is a case where three-dimensionally the same area is not seen in the same way on an image because the object has gloss anisotropy or a case where the tone level that is seen in an image is not seen in another image because of a difference in dynamic range. In such a case, the correspondence between the three-dimensional point group and the two-dimensional point group is not set correctly. Consequently, in the present embodiment, even in the case where the two-dimensional point group corresponding to the three-dimensional point group is not set correctly, it is made possible to perform range selection in a plurality of pieces of image data using the second within-range three-dimensional point group with high accuracy.

Figure 6:
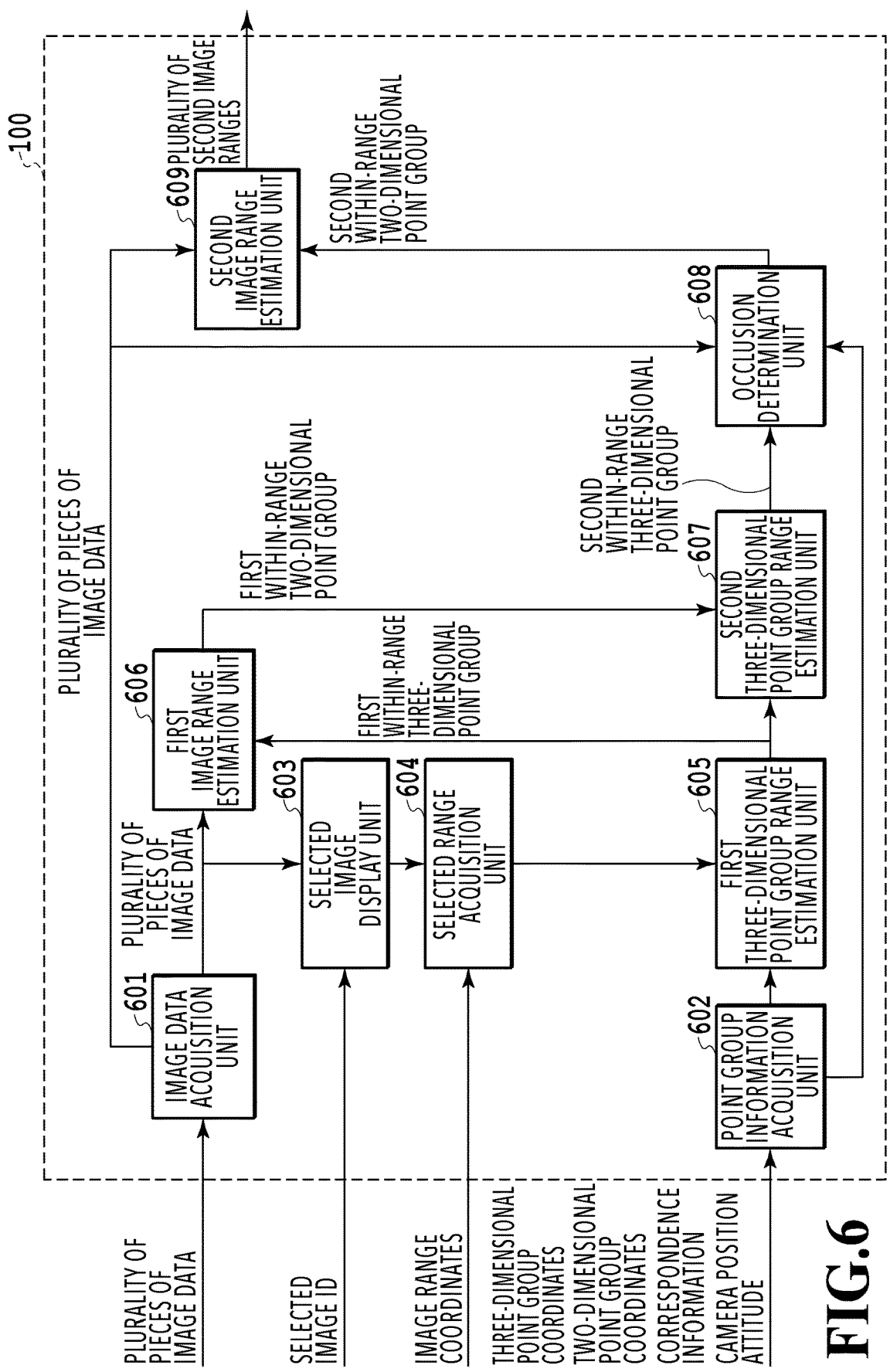
FIG. 6 is a function block diagram of an image processing apparatus according to an embodiment.
Figure 7:
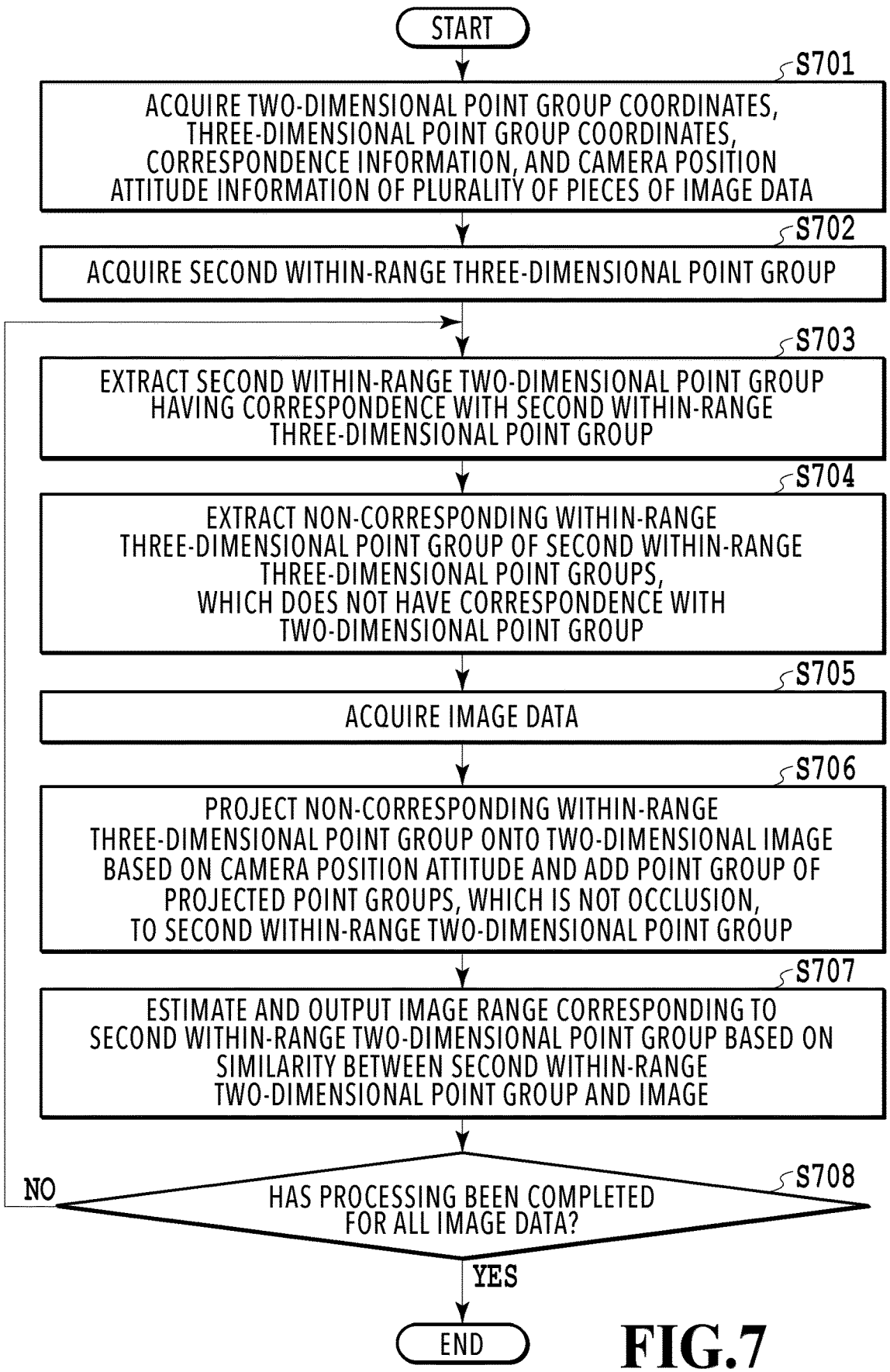
FIG. 7 is a processing flowchart of an image processing method according to an embodiment.

In the following, with reference to FIG. 6 and FIG. 7, image processing in the image processing apparatus 100 according to the present embodiment is explained. FIG. 6 is a function block diagram of the image processing apparatus 100 according to the present embodiment. FIG. 7 is a processing flowchart of an image processing method according to the present embodiment.

Compared to the function block diagram in FIG. 2, the function block diagram in FIG. 6 further includes an occlusion determination unit 608 and a second image range estimation unit 609. In the present embodiment, mainly by the occlusion determination unit 608 and the second image range estimation unit 609, range selection processing in a plurality of pieces of image data using the second within-range three-dimensional point group that is output in the first embodiment is performed.

Blocks 601 to 607 in FIG. 6 are the same as the blocks 201 to 207 in FIG. 2 and a point group information acquisition unit 602 in the present embodiment further acquires camera position attitude information (hereinafter, also described as a camera position attitude) on the camera that has captured each of the plurality of pieces of image data. The camera position attitude information includes position information on the camera and the direction of the camera. The camera position attitude is only required to be a viewpoint position attitude including position information on and the direction of the viewpoint for the object represented by each piece of image data. Specifically, compared to the point group information acquisition unit 202 in FIG. 2, the point group information acquisition unit 602 further acquires the camera position attitude information corresponding to each of the plurality of pieces of image data from the external memory 108 via the input interface 105 and stores the camera position attitude information in the RAM 102.

Further, in the present embodiment also, by executing programs stored in the ROM 103, the CPU 101 functions as each block described in FIG. 6 and performs the processing flow in FIG. 7. Further, the CPU 101 does not necessarily need to perform all the functions and it may also be possible to provide a processing circuit corresponding to each function within the image processing apparatus 100.

At step 701, the occlusion determination unit 608 acquires three-dimensional point group coordinates, two-dimensional point group coordinates, correspondence information on those, and the camera position attitude (viewpoint position attitude) corresponding to each of the plurality of pieces of image data stored in the RAM 102.

At step 702, the occlusion determination unit 608 acquires the second within-range three-dimensional point group stored in the RAM 102. At this time, it may also be possible to further acquire the outside-range three-dimensional point group other than the second within-range three-dimensional point group from the three-dimensional point groups stored in the RAM 102.

After this, processing at steps 703 to 707 is performed for each of the plurality of pieces of image data. Further, an image ID to identify the processing-target image data is described as a processing image ID.

At step 703, the occlusion determination unit 608 extracts a point group of the two-dimensional point groups of the image data with a processing image ID, which has a correspondence with the second within-range three-dimensional point group, as a second within-range two-dimensional point group of the image data with a processing image ID. That is, the occlusion determination unit 608 functions as a second two-dimensional point group extraction unit. The occlusion determination unit 608 stores the extracted second within-range two-dimensional point group in the RAM 102.

At this time, it may also be possible to further extract a point group of the two-dimensional point groups of the image data with a processing image ID, which has a correspondence with the outside-range three-dimensional point group, as a second outside-range two-dimensional point group in the image data with a processing image ID and to store the point group in the RAM 102.

At step 704, the occlusion determination unit 608 extracts a point group of the second within-range three-dimensional point groups, which does not have a correspondence with the two-dimensional point group of the image data with a processing image ID, as a non-corresponding within-range three-dimensional point group. That is, the occlusion determination unit 608 functions as a non-corresponding three-dimensional point group extraction unit. The occlusion determination unit 608 stores the extracted non-corresponding within-range three-dimensional point group in the RAM 102. The non-corresponding within-range three-dimensional point group includes, for example, a point group that is not set correctly so as to correspond to the two-dimensional point group because of gloss anisotropy and the like in the image data with a processing image ID.

At step 705, the occlusion determination unit 608 and the second image range estimation unit 609 acquire the image data with a processing image ID stored in the RAM 102.

At step 706, the occlusion determination unit 608 projects the non-corresponding within-range three-dimensional point group onto the two-dimensional image with the camera position attitude corresponding to the image data with a processing image ID and determines whether the projected point group is an occlusion. The occlusion determination unit 608 adds a point group that is not an occlusion to the second within-range two-dimensional point group. That is, the occlusion determination unit 608 functions as a second two-dimensional point group addition unit. Specifically, it is sufficient to determine that the projected point group is not an occlusion in the case where the color adjacent to the two-dimensional point group in another piece of image data, which corresponds to the non-corresponding within-range three-dimensional point group, and the color adjacent to the projected point group are similar, and that the projected point group is an occlusion in the case where the colors are different.

As described above, the occlusion determination unit 608 functions as a second two-dimensional point group acquisition unit configured to acquire the second within-range two-dimensional point group including the two-dimensional point group corresponding to the second within-range three-dimensional point group.

At step 707, the second image range estimation unit 609 estimates and outputs an image range corresponding to the second within-range two-dimensional point group based on the similarity between the second within-range two-dimensional point group and the image. At this time, it may be possible to use the method explained at step 304 as an estimation method of an image range. For example, in the case where the graph cut method is used, it may be possible to use the second within-range two-dimensional point group as the within-range seed 401. Further, in the case where there is a second outside-range two-dimensional point group, it may be possible to use the second outside-range two-dimensional point group as the outside-range seed 402. As described above, the second image range estimation unit 609 functions as an image range estimation unit configured to estimate an image range corresponding to the second within-range two-dimensional point group.

At step 708, the second image range estimation unit 609 determines whether the processing has been completed for all the image data and in the case where the processing has not been completed for all the image data, the processing returns to step 703 and the processing is repeated. On the other hand, in the case where the processing of all the image data has been completed, the processing flow is terminated.

As explained above, in the present embodiment, by using the second within-range three-dimensional point group that is output in the first embodiment, an image range in a plurality of pieces of image data representing the same object from different viewpoints is estimated and output.

Figure 8A:
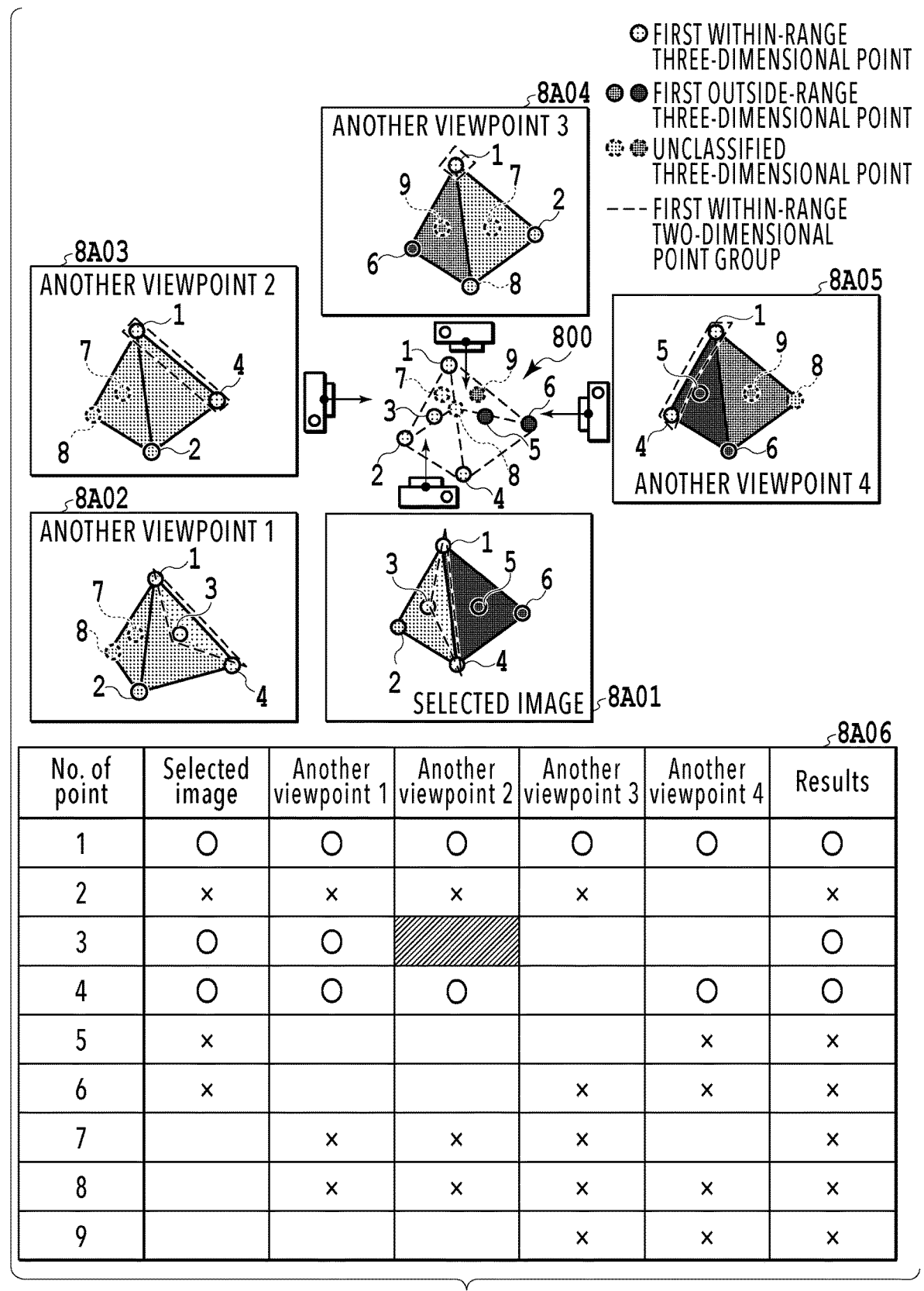
FIGS. 8A and 8B are schematic diagrams explaining image processing according to an embodiment.
Figure 8B:
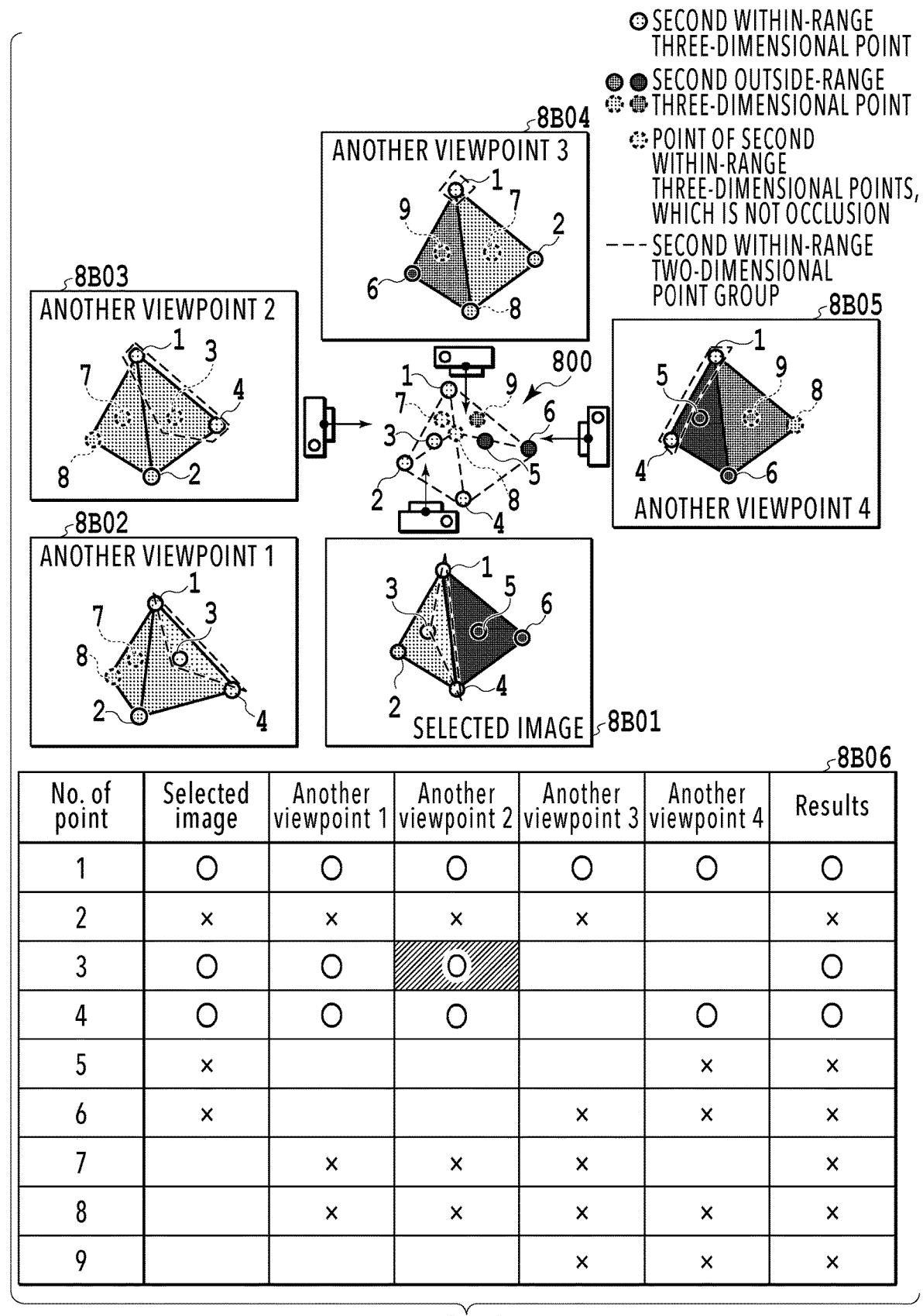

FIGS. 8A and 8B are schematic diagrams explaining image processing according to the present embodiment. In the following, with reference to FIGS. 8A and 8B, the image processing according to the present embodiment is explained.

In FIG. 8A, a three-dimensional point group 800 representing a three-dimensional shape of an object is a point group including nine points 1 to 9 and five pieces of image data 8A01, 8A02, 8A03, 8A04, and 8A05 obtained by capturing the object from different viewpoints are shown. It is assumed that at step 303, the image data 8A01 is displayed and the range surrounded by a dotted line in the image data 8A01 is taken to be the range selected at step 304. In the selected range, three points 1, 3, and 4 (two-dimensional point group) are included and at step 305, from the three-dimensional point group 800, three points 1, 3, and 4 are extracted as a first within-range three-dimensional point group.

Further, it is assumed that in FIG. 8A, point 3 is not recognized because of gloss anisotropy or a difference in dynamic range in the image data 8A03 of another viewpoint 2. That is, point 3 is a point that is not recognized despite that it is not an occlusion (that is, point 3 is a point that is not set correctly).

In the image data 8A02 of another viewpoint 1, in the case where area division is performed according to image similarity, the area is divided into two areas of the two-dimensional point group: an area of points 1, 3, and 4 and an area of points 2, 7, and 8. Points 1, 3, and 4 are the first within-range two-dimensional point group corresponding to the first within-range three-dimensional point group and another point group is not included in the same area, and therefore, points 1, 3, and 4 are the first within-range two-dimensional point group of the image data 8A02.

In the image data 8A03 of another viewpoint 2, in the case where area division is performed according to image similarity, the area is divided into two areas of the two-dimensional point group: an area of points 1 and 4 and an area of points 2, 7, and 8. Points 1 and 4 are the first within-range two-dimensional point group corresponding to the first within-range three-dimensional point group and another point group is not included in the same area, and therefore, points 1 and 4 are the first within-range two-dimensional point group of the image data 8A03.

In the image data 8A04 of another viewpoint 3, in the case where area division is performed according to image similarity, the area is divided into three areas of the two-dimensional point group: an area of point 1, an area of points 2 and 7 to 9, and an area of point 6. Point 1 is the first within-range two-dimensional point group corresponding to the first within-range three-dimensional point group and another point group is not included in the same area, and therefore, point 1 is the first within-range two-dimensional point group of the image data 8A04.

In the image data 8A05 of another viewpoint 4, in the case where area division is performed according to image similarity, the area is divided into three areas of the two-dimensional point group: an area of points 1 and 4, an area of points 5 and 6, and an area of points 8 and 9. Points 1 and 4 are the first within-range two-dimensional point group corresponding to the first within-range three-dimensional point group and another point group is not included in the same area, and therefore, points 1 and 4 are the first within-range two-dimensional point group of the image data 8A05.

The above results are put together in a table 8A06. Of the two-dimensional point groups of each piece of image data, the point that is the first within-range two-dimensional point group is indicated by o and the point that is not the first within-range two-dimensional point group is indicated by x. The empty cell in the table 8A06 indicates a point group (occlusion) of the three-dimensional point group of the object, in which the two-dimensional point group corresponding to each piece of image data is not included.

From the table 8A06, the ratio of the point being the first within-range two-dimensional point group is 100% for points 1, 3, and 4 and 0% for points 2 and 5 to 9. In the case where the threshold value (within-range determination threshold value) to determine as the second three-dimensional point group is taken to be 50%, points 1, 3, and 4 are extracted as the second within-range three-dimensional point group. In the table 8A06, point 3 of another viewpoint 3, for which a correspondence is not taken correctly despite that it is not an occlusion, is represented by a cell to which slashes are attached.

Here, the portion surrounded by a dotted line in each piece of image data in FIG. 8A is taken to be a first image range.

Next, the occlusion determination unit 608 performs occlusion determination of a non-corresponding within-range three-dimensional point group not having a correspondence with a two-dimensional point group in each piece of image data. As a result of this, in the image data 8A03 of another viewpoint 2, point 3 is determined not to be an occlusion (step 706).

Next, the second image range estimation unit 609 performs area division again based on the image similarity and the information on the within-range three-dimensional point group for the image in which a point group determined not to be an occlusion exists, in this example, the image data 8A03 of another viewpoint 2 (step 707). As a result of this, as shown in FIG. 8B, an adjacent area of points 1, 3, and 4 shown schematically by a dotted line in the image data 8A03 of another viewpoint 2 becomes a new second image range.

In the case where there is a point for which consistency between the second within-range three-dimensional point group and the first within-range two-dimensional point group is not achieved, although such a point does not exist in this example, it is desirable to update the first image range and to take the second image range.

Specifically, in the case where there is a point that does not correspond to the second within-range three-dimensional point group but is the first within-range two-dimensional point group, or conversely, there is a point the corresponds to the second within-range three-dimensional point group but is not the first within-range two-dimensional point group, it is sufficient to find the second image range by updating information on the second within-range two-dimensional point group.

In this manner, even in the case where the two-dimensional point group corresponding to the three-dimensional point group is not set correctly, it is possible to automatically perform range selection of a plurality of pieces of image data within a range neighboring and similar to the selected range based on the selected range on one selected image.

As explained above, according to the present embodiment, by using the second within-range three-dimensional point group that is output in the above-described first embodiment, it is possible to perform range selection in a plurality of pieces of image data representing the same object from different viewpoints. Further, even in the case where the two-dimensional point group corresponding to the three-dimensional point group is not set correctly, it is possible to perform range selection with high accuracy in a plurality of pieces of image data.

Third Embodiment

In a third embodiment, processing at the time of a user selecting an image that is displayed at step 303 of the above-described first embodiment is explained. At step 303, a user selects image data that is used for range selection from a plurality of pieces of image data, but in the case where the number of pieces of image data is large, it is difficult to select image data including the range of a desired three-dimensional point group. Because of this, in the present embodiment, a virtual viewpoint from which the range of a desired three-dimensional point group is easy to see is set and one or a plurality of pieces of image data of a viewpoint near to the virtual viewpoint is automatically selected in accordance with adjacency setting for the virtual viewpoint and presented to a user.

Figure 9:
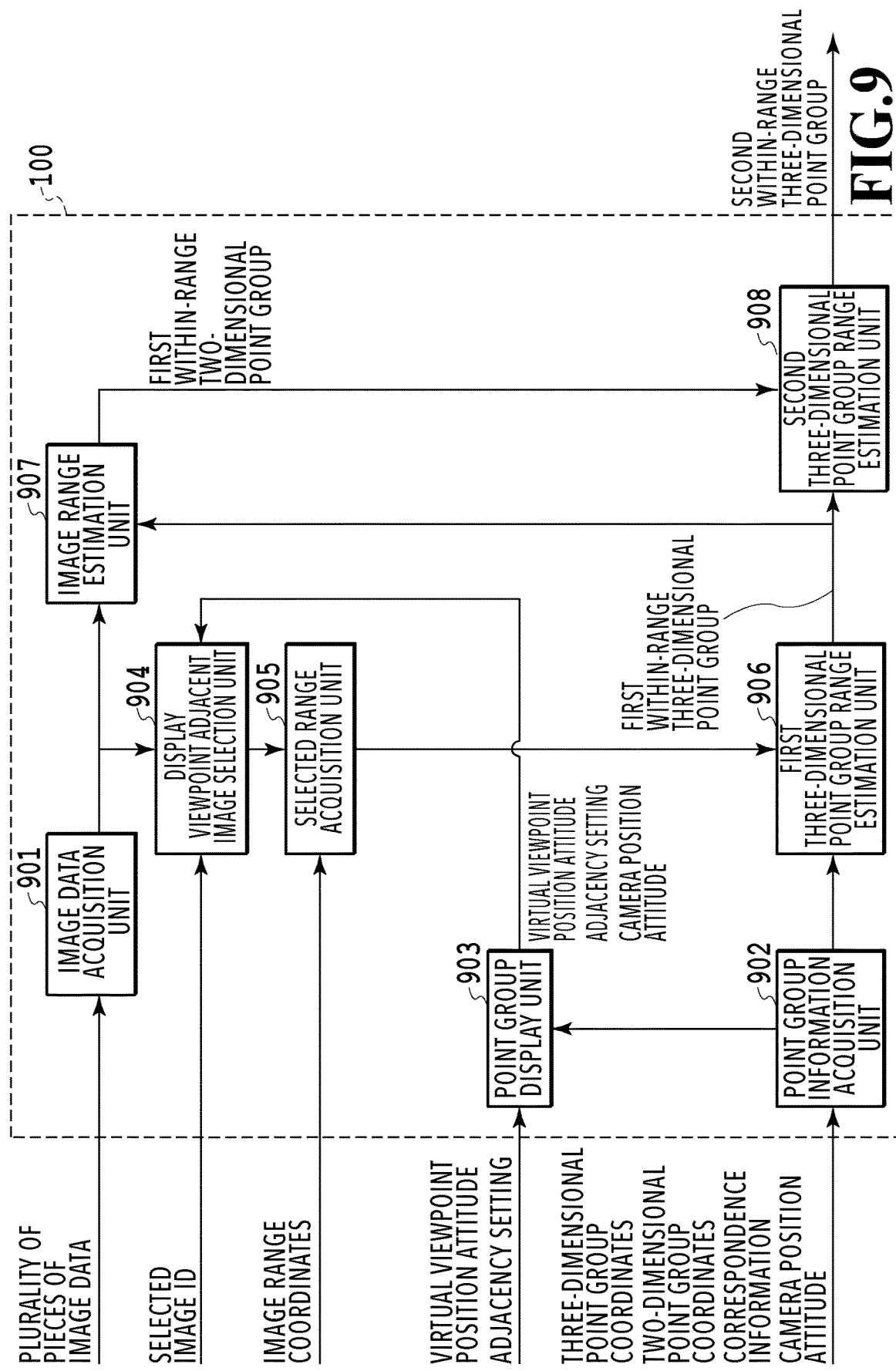
FIG. 9 is a function block diagram of an image processing apparatus according to an embodiment.
Figure 10:
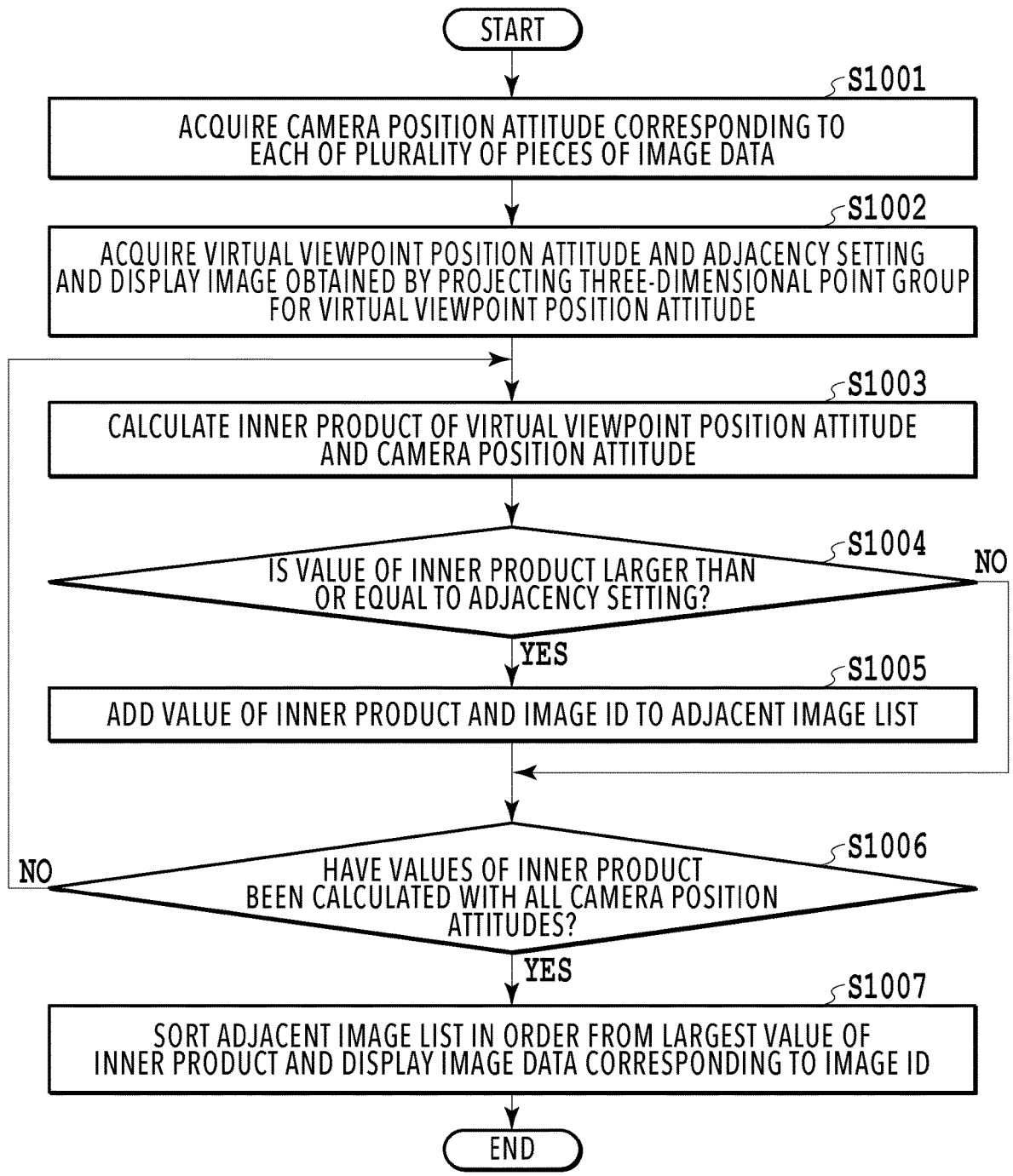
FIG. 10 is a processing flowchart of an image processing method according to an embodiment.

In the following, with reference to FIG. 9 and FIG. 10, image processing in the image processing apparatus 100 according to the present embodiment is explained. FIG. 9 is a function block diagram of the image processing apparatus 100 according to the present embodiment. FIG. 10 is a processing flowchart of an image processing method according to the present embodiment.

Compared to the function block diagram in FIG. 2, the function block diagram in FIG. 9 further includes a point group display unit 903 and a display viewpoint adjacent image selection unit 904. Blocks 901, 902, and 905 to 908 are the same as the blocks 201, 202, and 204 to 207 in FIG. 2 and the point group information acquisition unit 902 in the present embodiment further acquires a camera position attitude (viewpoint position attitude) of the camera that has captured each of the plurality of pieces of image data. Specifically, compared to the point group information acquisition unit 202 in FIG. 2, the point group information acquisition unit 902 further acquires the camera position attitude corresponding to each of the plurality of pieces of image data from the external memory 108 via the input interface 105 and stores the camera position attitude in the RAM 102.

In the present embodiment also, by executing programs stored in the ROM 103, the CPU 101 functions as each block described in FIG. 9 and performs the processing flow in FIG. 10. Further, the CPU 101 does not necessarily need to perform all the functions and it may also be possible to provide a processing circuit corresponding to each function within the image processing apparatus 100.

At step 1001, the point group information acquisition unit 902 acquires the camera position attitude (viewpoint position attitude) corresponding to each of the plurality of pieces of image data from the external memory 108 via the input interface 105 and the stores the camera position attitude in the RAM 102.

At step 1002, the point group display unit 903 acquires virtual viewpoint position attitude information and adjacency setting information from the external memory 108 via the input interface 105 and stores both the information in the RAM 102. The virtual viewpoint position attitude information includes position information on and the direction of the virtual viewpoint. The adjacency setting information is threshold value information about the value of the inner product of the camera position attitude and the virtual viewpoint position attitude. Further, the point group display unit 903 generates a display image by projecting the three-dimensional point group acquired at step 302 for the virtual viewpoint position attitude and displays the display image on the display device 109 via the output interface 106.

After this, the processing at steps 1003 to 1005 is performed for each of the plurality of pieces of image data.

At step 1003, the display viewpoint adjacent image selection unit 904 calculates the inner product of the camera position attitude acquired at step 1001 and the virtual viewpoint position attitude acquired at step 1002 and calculates the value of the inner product for the processing-target image data.

At step 1004, the display viewpoint adjacent image selection unit 904 determines whether the value of the inner product calculated at step 1003 is larger than or equal to the value of adjacency setting acquired at step 1002. In the case where the value of the inner product is larger than or equal to the value of adjacency setting, the processing advances to step 1005 and in the case where the value of the inner product is smaller than the value of adjacency setting, the processing at step 1005 is not performed and the processing advances to step 1006.

At step 1005, the display viewpoint adjacent image selection unit 904 stores the value of the inner product and the image ID of the processing-target image data in association with each other in the RAM 102 as an adjacent image list.

At step 1006, the display viewpoint adjacent image selection unit 904 determines whether the values of the inner product have been calculated with the camera position attitudes of all the image data. In the case where the values of the inner product have been calculated with the camera position attitudes of all the image data, the processing advances to step 1007 and in the other case, the processing returns to step 1003 and the processing is repeated.

At step 1007, the display viewpoint adjacent image selection unit 904 sorts the values of the inner product in the adjacent image list in the order from the largest value and displays the image data corresponding to the image ID on the display device 109 via the output interface 106 in this order. As described above, the display viewpoint adjacent image selection unit 904 functions as an image display unit configured to select and display one or a plurality of pieces of image data corresponding to a viewpoint or viewpoints adjacent to the virtual viewpoint.

Figure 11:
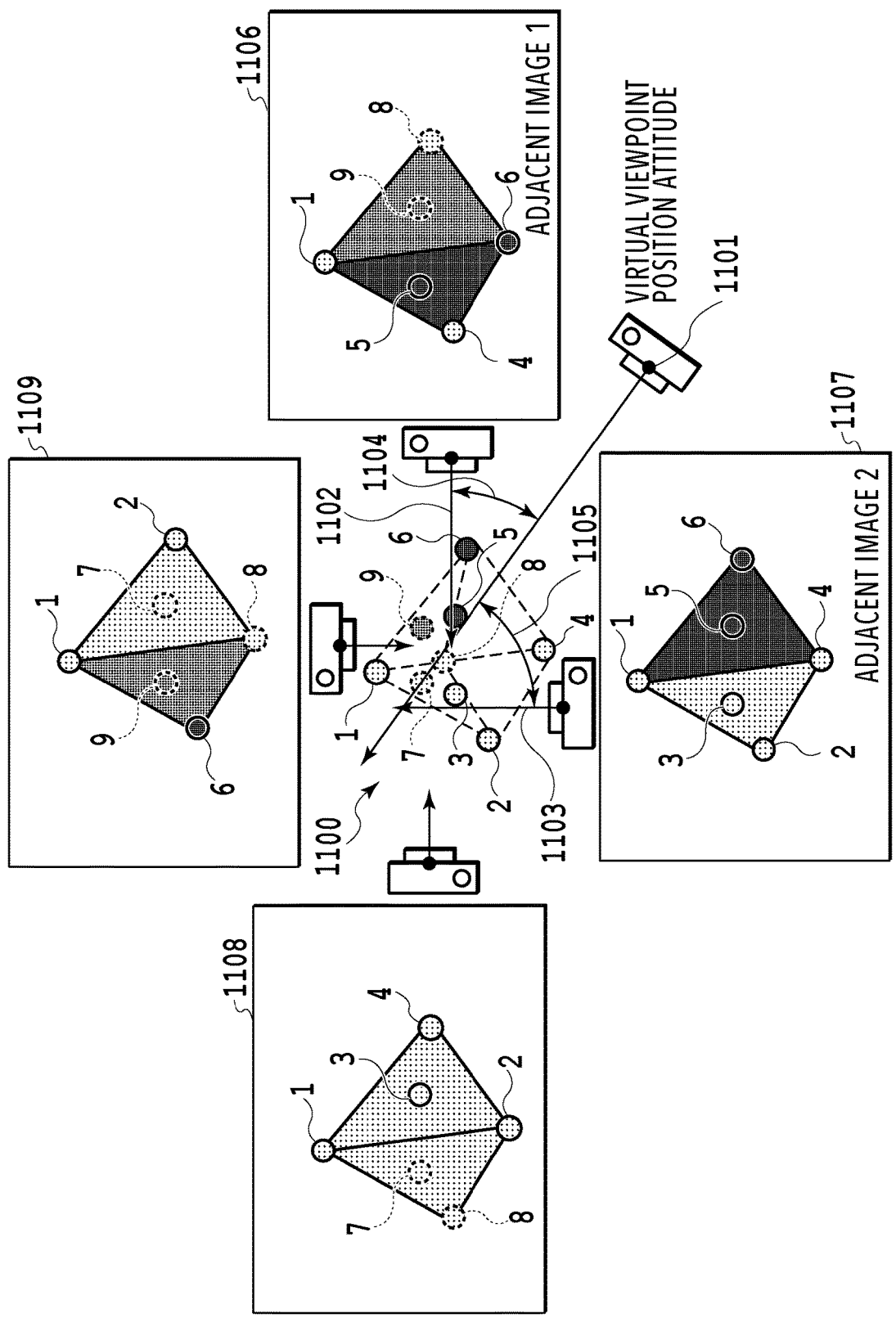
FIG. 11 is a schematic diagram explaining image processing according to an embodiment.

FIG. 11 is a schematic diagram explaining image processing according to the present embodiment. In the following, with reference to FIG. 11, the image processing according to the present embodiment is explained.

In FIG. 11, a three-dimensional point group 1100 representing a three-dimensional shape of an object is a point group including nine points 1 to 9 and four pieces of image data 1106, 1107, 1108, and 1109 obtained by capturing the object from different viewpoints are shown.

Here, it is assumed that the value of adjacency setting for the value of the inner product of a virtual viewpoint position attitude 1101 acquired by the point group display unit 903 and each camera position attitude is 0. In this case, the camera position attitude whose inner product with the virtual viewpoint position attitude is larger than or equal to the value of adjacency setting (that is, the angle formed therebetween is 90 degrees or less) is a camera position attitude 1102 (formed angle 1104) and a camera position attitude 1103 (formed angle 1105). Consequently, in the adjacent image list, the image ID of the adjacent image 1106 with the camera position attitude 1102, the image ID of the adjacent image 1107 with the camera position attitude 1103, and the values of the inner product thereof are included in association with one another.

As a result of this, by the display viewpoint adjacent image selection unit 904 displaying the adjacent image 1106 and the adjacent image 1107, it is possible for a user to select a desired image from among adjacent images with the virtual viewpoint position attitude without the need to check an image distant from the virtual viewpoint position attitude.

As explained above, according to the present embodiment, it is possible for a user to easily select image data including the range of a desired three-dimensional point group even in the case where the number of pieces of image data is large.

Fourth Embodiment

In a fourth embodiment, processing of the image processing apparatus 100 to generate an image that is displayed at step 303 of the above-described first embodiment is explained. In the above-described third embodiment, an image adjacent to the virtual viewpoint position attitude of a plurality of pieces of image data is presented to a user, but in the present embodiment, the image processing apparatus 100 generates an image whose viewpoint is the same as that of the virtual viewpoint position attitude and presents the image to a user.

Figure 12:
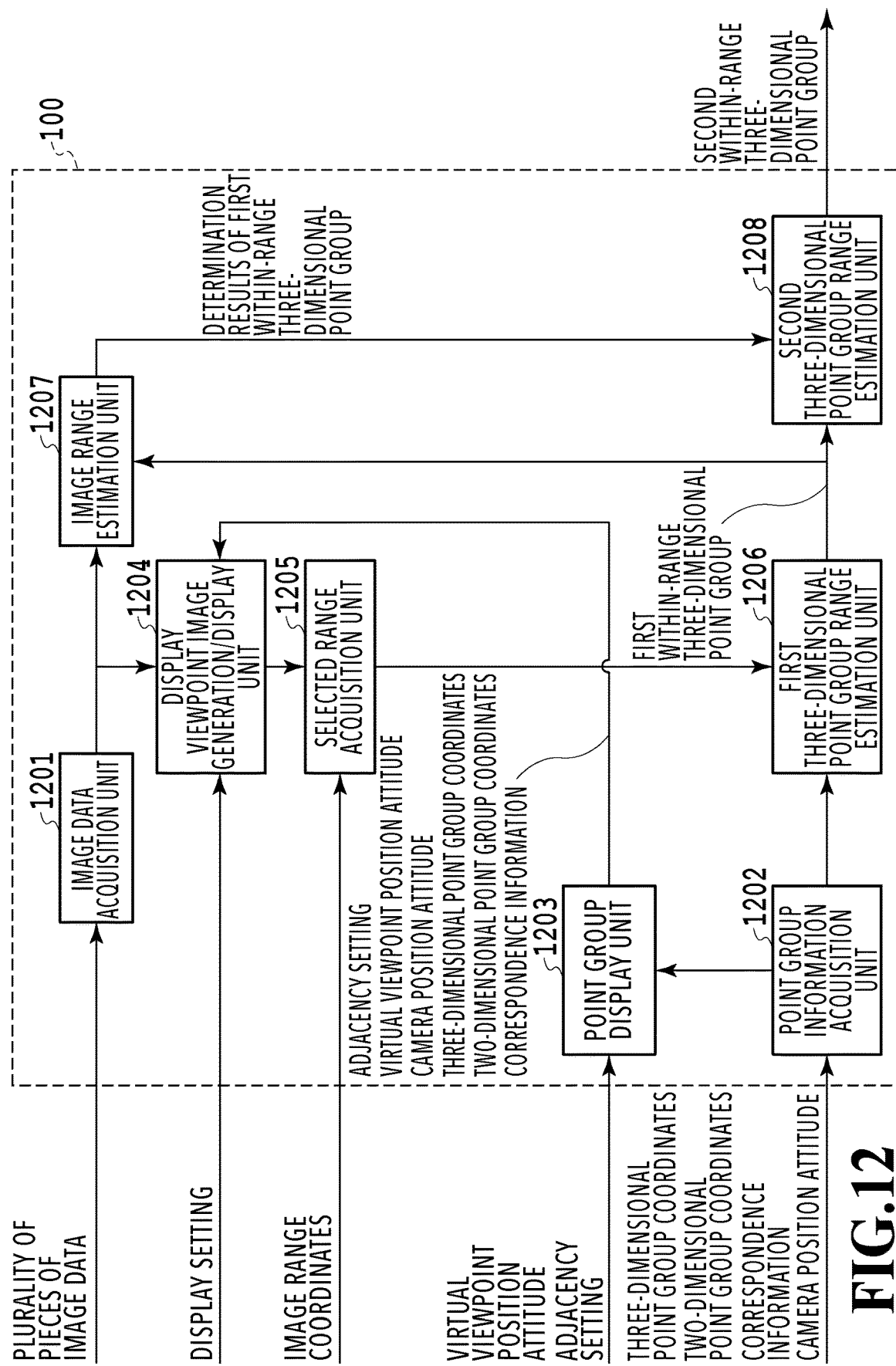
FIG. 12 is a function block diagram of an image processing apparatus according to an embodiment.
Figure 13:
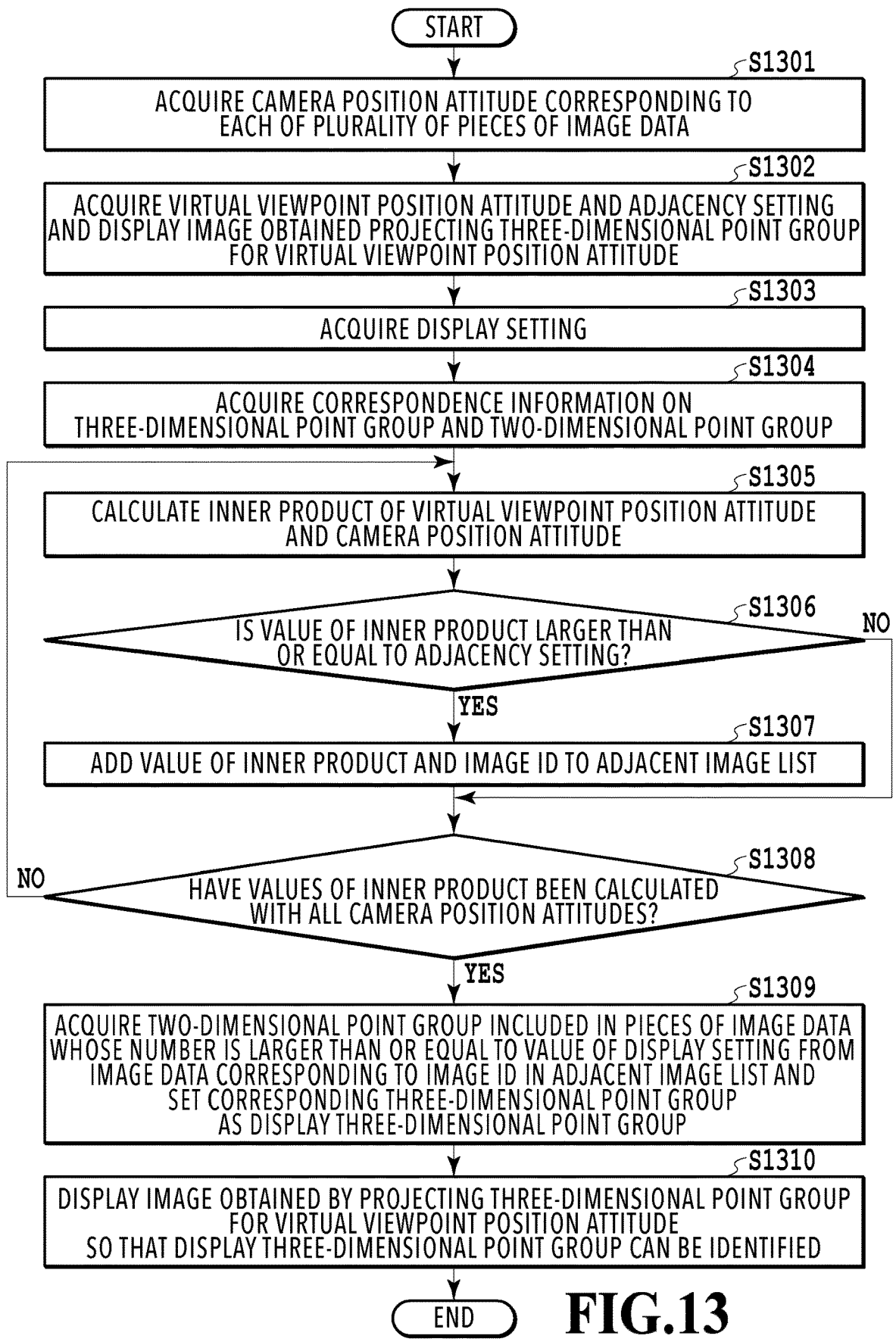
FIG. 13 is a processing flowchart of an image processing method according to an embodiment.

In the following, with reference to FIG. 12 and FIG. 13, image processing in the image processing apparatus 100 according to the present embodiment is explained. FIG. 12 is a function block diagram of the image processing apparatus 100 according to the present embodiment. FIG. 13 is a processing flowchart of an image processing method according to the present embodiment.

Compared to the function block diagram in FIG. 2, the function block diagram in FIG. 12 further includes a point group display unit 1203 and a display viewpoint image generation/display unit 1204. Blocks 1201, 1202, and 1205 to 1208 in FIG. 12 are the same as the blocks 201, 202, and 204 to 207 in FIG. 2. The point group information acquisition unit 1202 in the present embodiment further acquires a camera position attitude (viewpoint position attitude) corresponding to each of a plurality of pieces of image data. Specifically, compared to the point group information acquisition unit 202 in FIG. 2, the point group information acquisition unit 1202 further acquires the camera position attitude corresponding to each of the plurality of pieces of image data from the external memory 108 via the input interface 105 and stores the camera position attitude in the RAM 102.

In the processing flow in FIG. 13, explanation of the same processing step as the processing step in FIG. 10 in the above-described third embodiment is omitted.

In the present embodiment also, by executing programs stored in the ROM 103, the CPU 101 functions as each block described in FIG. 12 and performs the processing flow in FIG. 13. Further, the CPU 101 does not necessarily need to perform all the functions and it may also be possible to provide a processing circuit corresponding to each function within the image processing apparatus 100.

Step 1301 and step 1302 are the same as step 1001 and step 1002 in FIG. 10, and therefore, explanation is omitted.

At step 1303, the display viewpoint image generation/display unit 1204 acquires display setting from the external memory 108 via the input interface 105 and stores the display setting in the RAM 102. The display setting represents a predetermined number of camera position attitudes (that is, viewpoints) from which the target point is seen. Details will be described later.

At step 1304, the display viewpoint image generation/display unit 1204 acquires correspondence information on the three-dimensional point group and the two-dimensional point group stored in the RAM 102.

After this, at steps 1305 to 1308, the same processing as that at steps 1003 to 1006 in FIG. 10 is performed and an adjacent image list is generated. The processing at steps 1305 to 1308 is the same as that at steps 1003 to 1006 in FIG. 10, and therefore, explanation is omitted.

At step 1309, the display viewpoint image generation/display unit 1204 acquires a two-dimensional point group included in image data whose number is larger than or equal to the value of display setting from the image data corresponding to the image ID in the adjacent image list and extracts a three-dimensional point group corresponding to the acquired two-dimensional point group based on the correspondence information. The display viewpoint image generation/display unit 1204 sets the extracted three-dimensional point group as a display three-dimensional point group. For example, in the case of image data whose value of display setting is two or more viewpoints, the three-dimensional point group that is seen from image data with two or more viewpoints as image data whose value of display setting is larger than or equal to a predetermined number is set as a display three-dimensional point group.

At step 1310, the display viewpoint image generation/display unit 1204 generates an image (display viewpoint image) of the three-dimensional point group projected for the virtual viewpoint position attitude and displays the display three-dimensional point group so that the display three-dimensional point group can be identified. In the display viewpoint image, the display three-dimensional point group and the other three-dimensional point groups are displayed in different display methods. For example, it is may also be possible to display the display three-dimensional point group in a dark color and the other three-dimensional point groups in a pale color, or to display only the display three-dimensional point group. As described above, the display viewpoint image generation/display unit 1204 functions as an image generation/display unit of a display viewpoint image.

Figure 14:
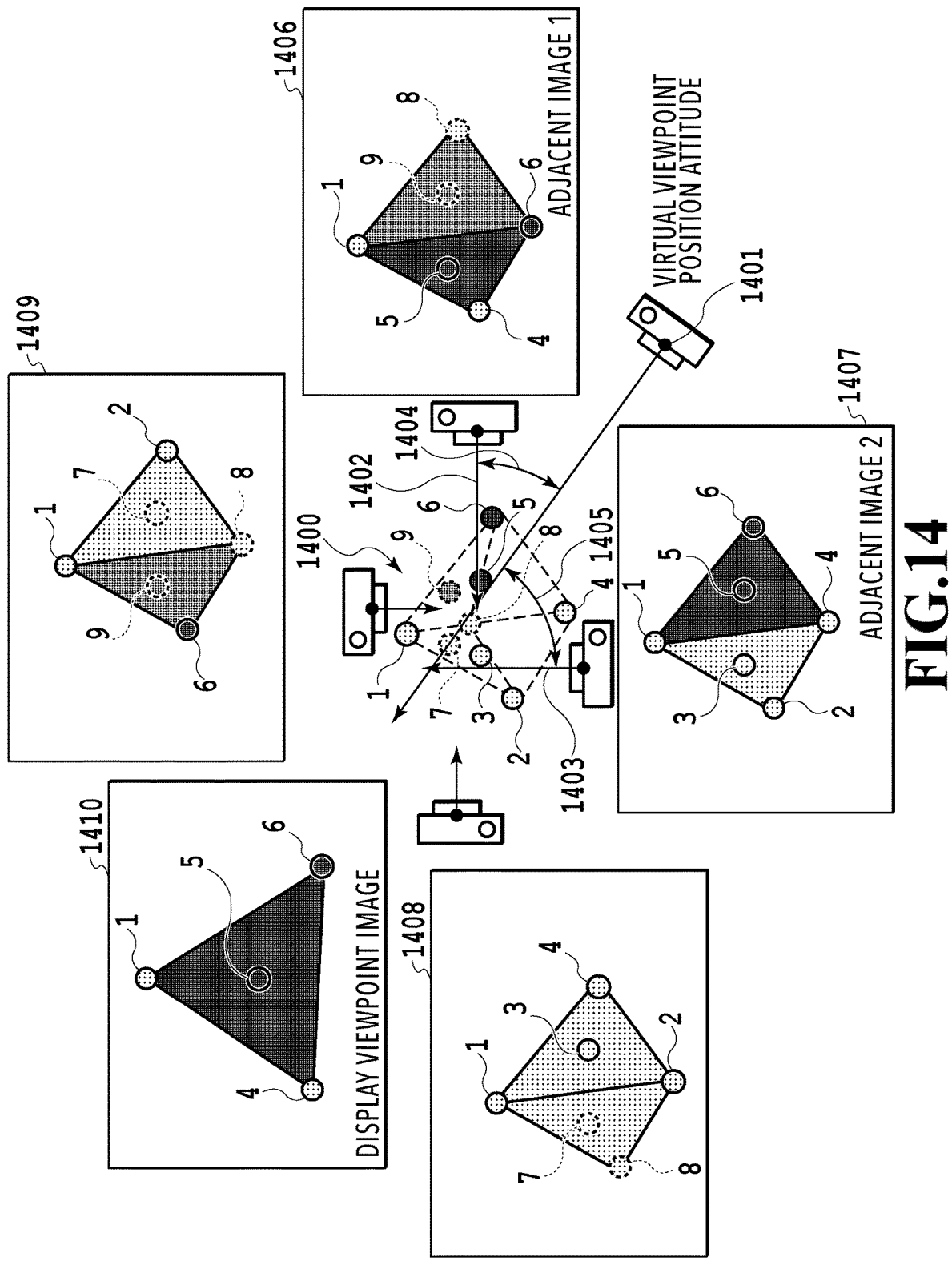
FIG. 14 is a schematic diagram explaining image processing according to an embodiment.

FIG. 14 is a schematic diagram explaining an image processing method according to the present embodiment. In the following, with reference to FIG. 14, the image processing method according to the present embodiment is explained.

In FIG. 14, a three-dimensional point group 1400 representing a three-dimensional shape of an object is a point group including nine points 1 to 9 and four pieces of image data 1406, 1407, 1408, and 1409 obtained by capturing the object from different viewpoints are shown.

Here, it is assumed that the value of adjacency setting for the value of the inner product of a virtual viewpoint position attitude 1401 acquired by the point group display unit 1203 and each camera position attitude is 0. In this case, the camera position attitude whose inner product with the virtual viewpoint position attitude is larger than or equal to the value of adjacency setting (that is, the angle formed therebetween is 90 degrees or less) is a camera position attitude 1402 (formed angle 1404) and a camera position attitude 1403 (formed angle 1405). Consequently, in the adjacent image list, the image ID of the adjacent image 1406 with the camera position attitude 1402, the image ID of the adjacent image 1407 with the camera position attitude 1403, and the values of the inner product thereof are included in association with one another.

Here, in the case where the value of display setting is taken to be the camera position attitude with two or more viewpoints, the display three-dimensional point group (points displayed on two or more pieces of image data) is a point group of the three-dimensional groups, which includes points 1, 4, 5, and 6.

As a result of this, in the case where the display viewpoint image generation/display unit 1204 displays only the display three-dimensional point group, a display viewpoint image 1410 including points 1, 4, 5, and 6 is displayed. Consequently, points 2, 3, 7, 8, and 9 that ought not to be seen in the case where the object is seen from the virtual viewpoint position attitude 1401 are not displayed, and therefore, selection of a point group by a user is made simple.

As explained above, according to the present embodiment, by generating and displaying an image viewed from the same viewpoint as that of the virtual viewpoint position attitude, it is possible for a user to easily perform range selection at the same viewpoint as that of the virtual viewpoint position attitude.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-075389, filed Apr. 5, 2017, which is hereby incorporated by reference wherein in its entirety.

What is claimed is:

1. An image processing apparatus comprising:
one or more memories storing instructions; and
one or more processors executing the instructions to:
cause a display device to display a display image based on a captured image of at least one image capturing apparatus of a plurality of image capturing apparatuses;
specify a first area on a three-dimensional shape model which is generated based on a plurality of captured images obtained by the plurality of image capturing apparatuses and which corresponds to a designated area on the display image,
specify, based on the first area on the three-dimensional shape model, a second area within a captured image or captured images of one or more other image capturing apparatuses different from the at least one image capturing apparatus of the plurality of image capturing apparatuses; and
specify a third area on the three-dimensional shape model based on the second area and based on an image feature of the captured image or the captured images of the one or more other image capturing apparatuses.

2. The image processing apparatus according to claim 1, wherein
the display image is a captured image of the at least one image capturing apparatus.

3. The image processing apparatus according to claim 1, wherein
the display image is an image that is obtained by performing predetermined image processing for a captured image of the at least one image capturing apparatus.

4. The image processing apparatus according to claim 1, wherein
the display image is a virtual viewpoint image that is generated from captured images by two or more image capturing apparatuses of the plurality of image capturing apparatuses.

5. The image processing apparatus according to claim 1, wherein
the one or more processors further executes the instructions to select the at least one image capturing apparatus from the plurality of image capturing apparatuses, and
the display image is image based on a captured image of the at least one image capturing apparatus selected from the plurality of image capturing apparatuses.

6. The image processing apparatus according to claim 5, wherein
the at least one image capturing apparatus is selected from the plurality of image capturing apparatuses by using information on a line-of- sight direction designated by a user.

7. The image processing apparatus according to claim 1, wherein
the one or more processors further executes the instructions to:
select one or a plurality of image capturing apparatus from the plurality of image capturing apparatuses, whose difference between a capturing direction and a line-of-sight direction is less than a threshold value;
cause a display device to display a captured image or captured images of the selected one or plurality of image capturing apparatuses; and
select a image capturing apparatus corresponding to a captured image designated by a user from one or a plurality of captured images displayed on the display device as the at least one image capturing apparatus.

8. The image processing apparatus according to claim 1, wherein the
third area on a three-dimensional shape model
is specified based on the second area which is adjusted based on the image feature of the captured image or the captured images of the one or more other image capturing apparatuses.

9. The image processing apparatus according to claim 8, wherein
the second area is specified by using association information for associating coordinates of the three-dimensional shape model with coordinates of the captured image.

10. The image processing apparatus according to claim 8, wherein
the second area is adjusted, in a case where image data of a neighboring area that neighbors the second area is similar to image data of the second area, so that the neighboring area is included in the second area.

11. The image processing apparatus according to claim 8, wherein
the second area is adjusted, in a case where a difference between a pixel value of a neighboring area that neighbors the second area and a pixel value of the second area is less than a threshold value, so that the neighboring area is included in the second area.

12. The image processing apparatus according to claim 8, wherein
the one or more processors further executes the instructions to:
specify one or a plurality of points not corresponding to a point group within a captured image of the other image capturing apparatus of point groups making up an area on the three-dimensional shape model;
add the specified one or plurality of points to within a captured image of the other image capturing apparatus;
further adjust the second area based on an image feature of a captured image to which the one or plurality of points is added; and
specify an area on the three-dimensional shape model based on the further adjusted second area.

13. A method for controlling an image processing apparatus, the method comprising the steps of:
causing a display device to display a display image based on a captured image of at least one image capturing apparatus selected from a plurality of image capturing apparatuses;
and
specifying a first area on a three-dimensional shape model which is generated based on a plurality of captured images obtained by the plurality of image capturing apparatuses and which corresponds to a designated area on the display image;
specifying, based on the first area on the three-dimensional shape model, a second area within a captured image or captured images of one or more other image capturing apparatuses different from the at least one image capturing apparatus of the plurality of image capturing apparatuses; and specifying a third area on the three-dimensional shape model based on the second area and based on an image feature of the captured image or the captured images of the one or more other image capturing apparatuses.

14. A non-transitory computer readable storage medium storing a program for causing a computer to perform a method for controlling an image processing apparatus, the method comprising the steps of:
causing a display device to display a display image based on a captured image of at least one image capturing apparatus selected from a plurality of image capturing apparatuses;
and
specifying a first area on a three-dimensional shape model which is generated based on a plurality of captured images obtained by the plurality of image capturing apparatuses and which corresponds to a designated area on the display image;
specifying, based on the first area on the three-dimensional shape model, a second area within a captured image or based on captured images of two or more one or more other image capturing apparatuses cameras different from the at least one image capturing apparatus of the plurality of image capturing apparatuses; and
specifying a third area on the three-dimensional shape model based on the second area and based on an image feature of the captured image or the captured images of the one or more other image capturing apparatuses.

* * * * *